UNITED STATES PATENT OFFICE.

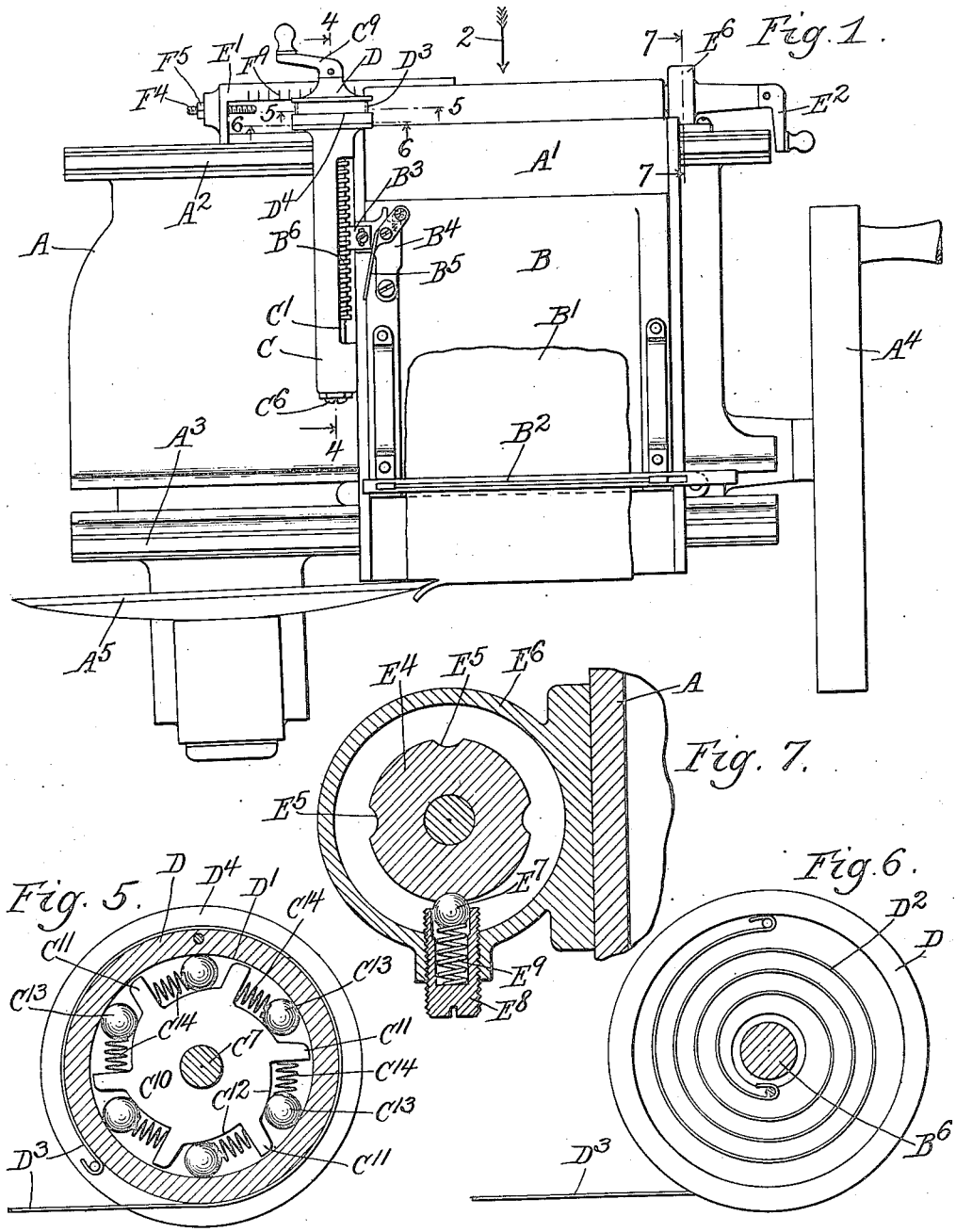

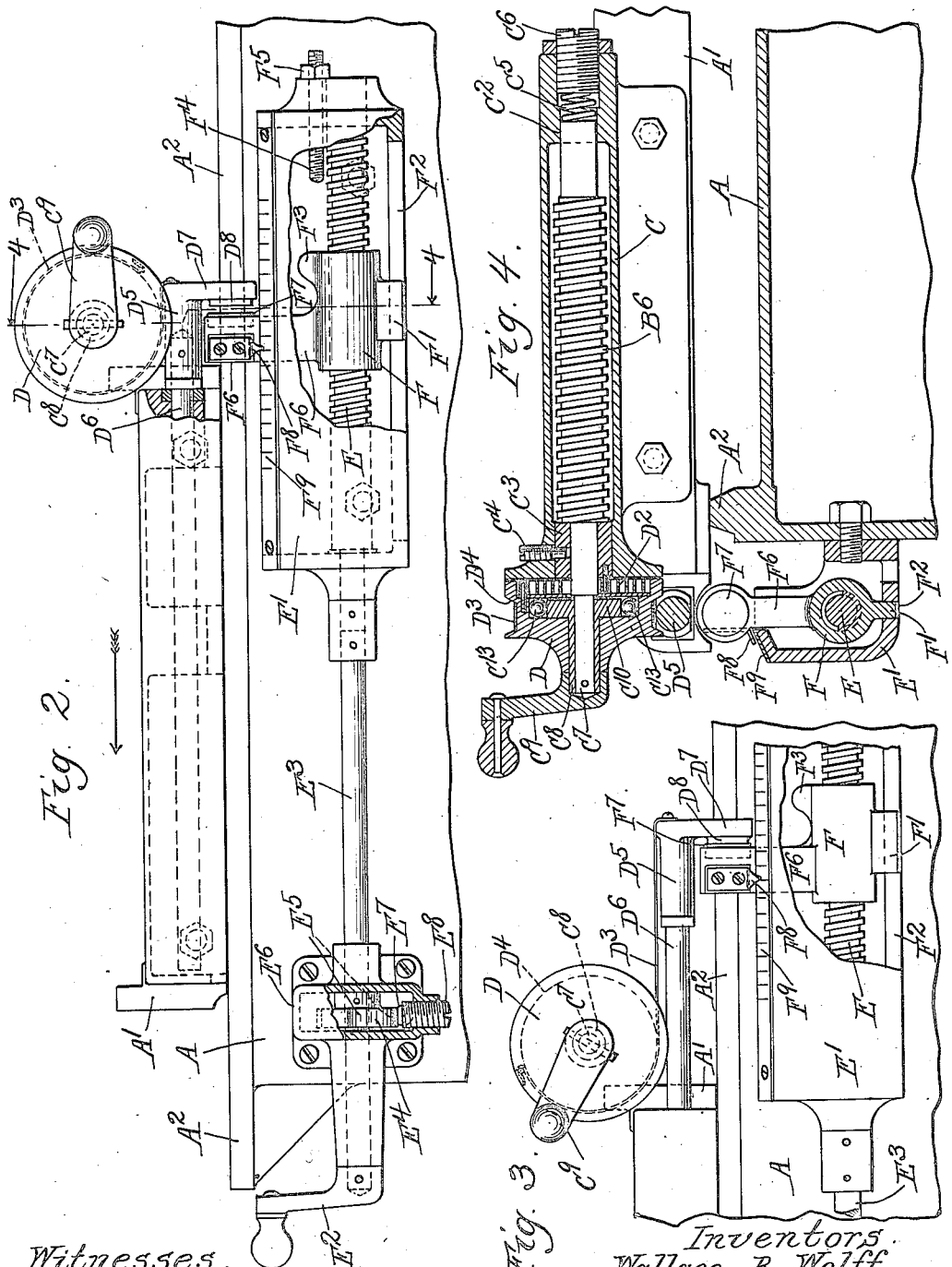

WALLACE B. WOLFF, OF CHICAGO, ILLINOIS, AND ERNEST K. HOOD, OF INDIANAPOLIS, INDIANA, ASSIGNORS TO AMERICAN SLICING MACHINE COMPANY, OF CHICAGO, ILLINOIS, A CORPORATION OF NEW YORK.

INTERMITTENT FEEDING MECHANISM FOR SLICING-MACHINES.

1,224,989.            Specification of Letters Patent.     Patented May 8, 1917.

Application filed November 24, 1915. Serial No. 63,184.

*To all whom it may concern:*

Be it known that we, WALLACE B. WOLFF and ERNEST K. HOOD, citizens of the United States, residing, respectively, at Chicago, in the county of Cook and State of Illinois, and at Indianapolis, in the county of Marion and State of Indiana, have invented a certain new and useful Improvement in Intermittent Feeding Mechanism for Slicing-Machines, of which the following is a specification.

Our invention relates to improvements in feed devices for slicing machines and has for one object to provide a feed device which will feed the meat toward the cutting knife. Another object is to provide the meat in response to the reciprocations to the meat carriage. Another object is to provide a device which will give any desired amount of feed for each reciprocation of the carriage. Another object is to provide a device which can be easily controlled and adjusted to vary and correct the meat feed. Other objects of our invention will appear from time to time in the specification.

Our invention is illustrated more or less diagrammatically in the accompanying drawings, wherein—

Figure 1 is a plan view of a slicing machine with our invention installed,

Fig. 2 is a side elevation in part section of our device, the line of sight being along the line of arrows 2 in Fig. 1, Fig. 3 is a detail side elevation with part broken away showing the parts in a different position.

Fig. 4 is a section along the line 4—4 of Figs. 1 and 2,

Fig. 5 is a section along the line 5—5 of Fig. 1,

Fig. 6 is a section along line 6—6 of Fig. 1,

Fig. 7 is a section along the line 7—7 of Fig. 1.

Like parts are indicated by like letters throughout the several figures.

A is a slicing machine frame. The carriage $A^1$ is adapted to reciprocate along the tracks $A^2$ $A^3$, being driven by any suitable means in response to the rotation of the drive wheel $A^4$. $A^5$ is the cutting knife rotated by any suitable driving means not shown in response to the rotation of the drive wheel $A^6$.

B is a meat plate adapted to slide along the carriage $A^1$ toward the knife. It carries a piece of meat $B^1$ held by the clamp $B^2$. $B^3$ is a nut mounted on the lever $B^4$ controlled by the thumb piece $B^5$ so that it may be thrust into or out of engagement with the feed screw $B^6$, which screw is mounted for rotation on the carriage $A^1$.

C is a cylindrical housing for the feed screw $B^6$ open as at $C^1$ to permit movement of the nut $B^3$ along the screw and still afford substantial protection for the screw. This housing C contains at one end a bearing $C^2$ for one end of the shaft upon which the feed screw is mounted. At the other end it contains a bearing sleeve $C^3$ for the other end of the feed screw shaft. This sleeve is held in position by set screw $C^4$ and a spring $C^5$ yieldingly thrusts the lead screw outwardly against the sleeve, the tension on the spring being adjusted by a screw $C^6$. $C^7$ is an extension projecting from the end of the lead screw supporting shaft, on which is keyed a sleeve $C^8$ carrying at one end a handle $C^9$, at the other end a clutch plate $C^{10}$, which clutch plate has fingers $C^{11}$ interposed between cam surfaces $C^{12}$, balls $C^{13}$ adapted to roll along these cam surfaces being forced yieldingly toward the outer ends thereof by springs $C^{14}$ abutting against the fingers $C^{11}$.

D is a clutch drum. It has a cylindrical inner surface $D^1$ against which the balls $C^{13}$ are yieldingly pressed. It contains a coil spring $D^2$. This spring is anchored at one end on the sleeve $C^3$, at the other end on the interior of the clutch drum D. $D^3$ is a flexible drive belt anchored at one end on the clutch drum D adapted to ride in the slot $D^4$ in the periphery thereof, and anchored at the other end on the dog $D^5$ which dog is mounted on and guided by a shaft $C^6$ slidable in the carriage $A^1$. The dog has a downwardly extending arm $D^7$ provided with a contact face $D^8$.

E is an adjustment screw mounted for rotation in a housing $E^1$ on the main frame or base A. It is adapted to be operated by a crank $E^2$ through a shaft $E^3$. This shaft carries a stop plate $E^4$ notched at $E^5$, and rotated within a bearing housing $E^6$ in opposition to a stop ball $E^7$ in a hollow plug $E^8$, the ball being yieldingly pressed against the disk $E^4$ between the spring $E^9$ in the hollow screwed threaded plug, the rotation of the plug of course rsulting in changing the tension on the spring, the walls of the plug preventing displacement of the ball.

F is a sleeve in screw threaded engagement with the adjustment screw E. It is guided and held against rotation by a lug $F^1$ engaging the groove $F^2$ in the housing $E^1$. The sleeve has a shoulder $F^3$ adapted to engage a limit screw $F^4$ screw threaded in the housing $E^1$ and locked in position by the nut $F^5$. Projecting upwardly from the sleeve F is a stop arm $F^6$ having a stop surface $F^7$ in opposition to the stop surface $D^8$. It also carries a pointer $F^8$ in opposition to a scale $F^9$ on the housing $E^1$.

It will be evident that while we have shown in our drawings an operative device, still many changes might be made both in size, shape and arrangement of parts without departing from the spirit of our invention and we wish, therefore that our drawings be regarded as in a sense diagrammatic.

The use and operation of our invention is as follows:

The meat plate is placed on the meat carriage so that it may slide therealong. The nut by manipulation of the lever is thrown in engagement with the lead screw. The meat is then placed on the meat plate and locked in position by the clamp. The operator then rotates the drive wheel causing a reciprocation of the meat carriage back and forth toward and from the knife. Meanwhile the knife is rotated so that as the meat is fed toward it, a slice may be cut off. It is necessary of course that upon each reciprocation of the meat plate, the meat be fed forward a certain distance equal to the thickness of the slices. This feed is caused by a progressive rotation of the lead screw. By referring to Figs. 2, 3 and 4 it will be noted that the adjustable stop on the side of the frame may be moved at the will of the operator, and by the manipulation of the small crank adjacent the drive wheel. This stop is in the path of a part as shown carried on the carriage. As the carriage reciprocates, this part engages the stop and it is held while the carriage goes on. The ribbon or band anchored at one end on this part is thus drawn out and the carriage drum is rotated in the position shown in Fig. 2 to the position shown in Fig. 3. The farther forward the stop is moved, the sooner will it contact the ribbon supporting member and the farther will the ribbon be drawn out by the movement of the carriage. It will be understood of course, that by this arrangement, the clutch drum is rotated back and forth. On its forward movement in a clockwise direction as shown in Fig. 5, the clutch balls are clamped between the cams and the clutch ring, and the feed screw is moved forward. As the carriage returns the drum is wound up by the spiral spring and when moving in the return direction the balls are thrust back against their springs and no power is transmitted. The balls by the reverse movement of the clutch housing are rolled back along the cam surfaces toward the springs and as they roll back they gradually approach the center of rotation owing to the contour of the cams. This reduces the pressure on the clutch ring, and so of course no power is transmitted. The clutch member is always returned to its normal inoperative position by the spring and it always starts from that position. The distance the strap or belt or coil spring is drawn out thus directly controls the amount of rotation of the lead screw and thus by varying the distance of such drawing out the angular movement of the lead screw and the feed of the meat plate is thus varied and controlled. Since the operator may manipulate the adjustment screw to change the position of the stop by rotating it through any desired angle, it is obvious any thickness of slice may be obtained, that there is no limitation on the thickness or a maximum and the stop is provided to limit the outer movement of the adjustable stop so that there is no possibility of breaking the tension band. The yielding arrangement shown in Fig. 7 is only for the purpose of yielding and locking the adjustment screw in position. There might be any suitable number of notches, or the notches might be dispensed with and the mere frictional pressure of the ball on the surface be utilized to hold the parts in the predetermined position.

The hand crank on the end of the lead screw is of course provided in order that the operator may move the carriage meat plate back and forth at his will independent of the driving mechanism.

We claim:

1. A reciprocating member, a rotatable element carried thereby, and means for effecting its rotation responsive to the movement of the reciprocating member comprising a drum rotatable on the element, a ratchet interposed between the drum and the element, and a flexible belt wound about the drum and having its free end anchored against movement.

2. A reciprocating member, a rotatable element carried thereby, and means for effecting its rotation responsive to the movement of the reciprocating member comprising a guide member mounted for reciprocation with respect to the reciprocating member, a drum rotatable on the element and a ratchet clutch between the element and the drum, a flexible belt wound about the drum and having its free end rigidly attached to the guide member.

3. A reciprocating member, a rotatable element carried thereby, and means for effecting its rotation responsive to the movement of the reciprocating member comprising a guide member mounted for reciprocation with respect to the reciprocating member, a drum rotatable on the element and a ratchet clutch between the element and the drum, a flexible belt wound about the drum and having its free end rigidly attached to the guide member and a stop in the path of the guide member out of line with the reciprocating member.

4. A reciprocating member, a rotatable element carried thereby, and means for effecting its rotation responsive to the movement of the reciprocating member comprising a guide member mounted for reciprocation with respect to the reciprocating member, a drum rotatable on the element and a ratchet clutch between the element and the drum, a flexible belt wound about the drum and having its free end rigidly attached to the guide member and a stop in the path of the guide member out of line with the reciprocating member and means for adjusting the position of said stop along the line parallel with the line of movement of the reciprocating member.

5. A reciprocating member, a rotatable element carried thereby, and means for effecting its rotation responsive to the movement of the reciprocating member comprising a drum rotatable on the element, a ratchet between the element and the drum a guide bar mounted for reciprocation on the reciprocating member, a finger projecting downwardly from said bar below such reciprocating member, a flexible belt wound about the drum and attached to such guide bar, a support upon which the reciprocating member is mounted and a stop carried by such support projecting in the path of the downwardly projecting member.

6. A reciprocating member, a rotatable element carried thereby, and means for effecting its rotation responsive to the movement of the reciprocating member comprising a drum rotatable on the element, a ratchet between the element and the drum a guide bar mounted for reciprocation on the reciprocating member, a finger projecting downwardly from said bar below such reciprocating member, a flexible belt wound about the drum and attached to such guide bar, a support upon which the reciprocating member is mounted and a stop carried by such support projecting in the path of the downwardly projecting member, said stop comprising a carriage, guides therefor, a nut forming a part thereof and a screw in engagement with such nut means for rotating said screw to move the nut and carriage along the guides.

Signed at Chicago, in the county of Cook and State of Illinois, this 8th day of November, 1915.

WALLACE B. WOLFF.

Witnesses:
O. W. BARTLETT,
ARTHUR J. TAYLOR.

Signed at Indianapolis, in the county of Marion and State of Indiana, this 12 day of November, 1915.

ERNEST K. HOOD.

Witnesses:
T. C. JONES,
M. M. THOMAS.